United States Patent [19]

Horimoto

[11] Patent Number: 4,532,566
[45] Date of Patent: Jul. 30, 1985

[54] TAPE CASSETTE

[75] Inventor: Rioichi Horimoto, Komoro, Japan

[73] Assignee: TDK Corporation, Tokyo, Japan

[21] Appl. No.: 427,774

[22] Filed: Sep. 29, 1982

[30] Foreign Application Priority Data

Nov. 16, 1981 [JP] Japan ............................ 56-170365[U]

[51] Int. Cl.³ .......................................... G11B 23/02
[52] U.S. Cl. .................................... 360/132; 360/137; 206/807
[58] Field of Search .......................... 360/132, 60, 137; 206/807

[56] References Cited

U.S. PATENT DOCUMENTS

| 3,997,916 | 12/1976 | Staar | 360/60 |
| 4,215,377 | 7/1980 | Norris | 360/132 X |
| 4,390,104 | 6/1983 | Cummings | 206/807 X |
| 4,398,634 | 8/1983 | McClosky | 206/807 X |

Primary Examiner—John H. Wolff
Attorney, Agent, or Firm—Robert Scobey

[57] ABSTRACT

A tape cassette has at least one opening in a surface thereof closed by a film monolithically formed with the cassette body and which is broken by a protuberance on a tape recorder with which the cassette is used following first use of the cassette. An unbroken film is indicative of a fresh, unused cassette.

8 Claims, 3 Drawing Figures

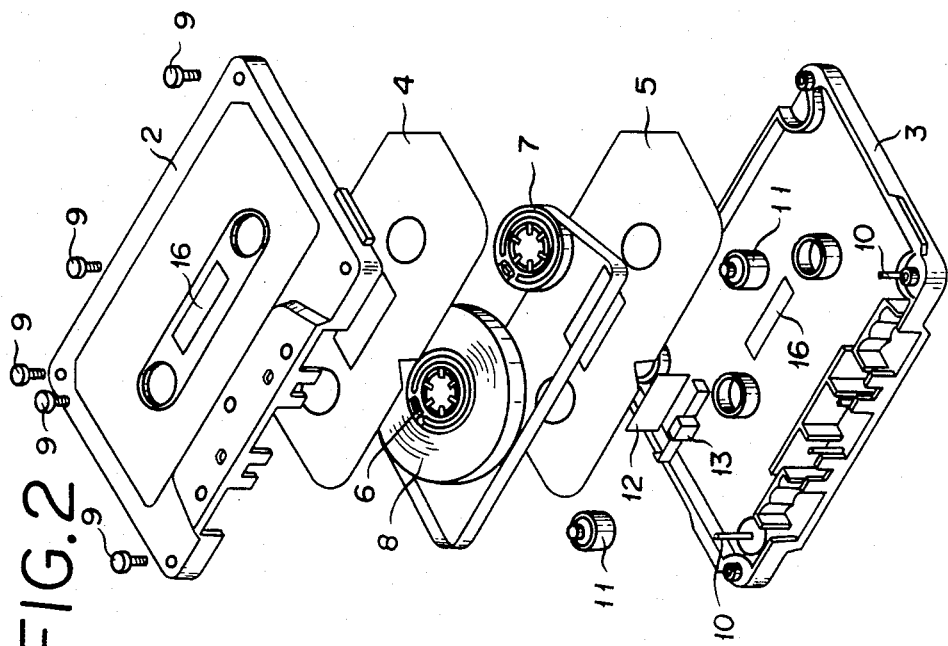
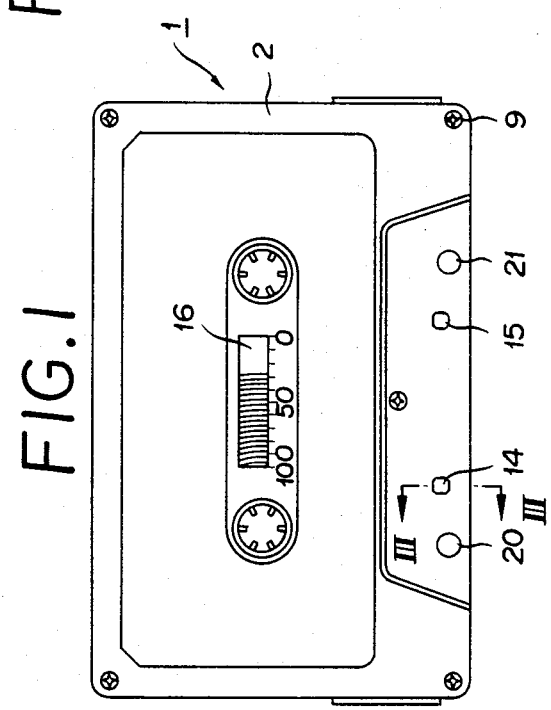
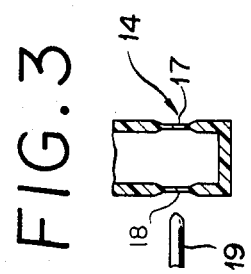

TAPE CASSETTE

BACKGROUND OF THE INVENTION

1. Field of the Invention

This invention relates to a tape cassette. More particularly, this invention relates to a tape cassette capable of enabling the user thereof to ascertain whether the tape cassette has been kept unused or otherwise.

2. Description of Prior Arts

Generally, a new tape cassette is enclosed with a plastic or paper package and further wrapped with a cellophane bag when it is displayed for sale in the market. Once the outermost wrapper used on this kind of tape cassette is taken off, it is extremely difficult for any person to tell whether it is still an unused article or it is a used article. This difficulty has frequently invited disputes.

An object of this invention, therefore, is to provide an improved tape cassette.

Another object of this invention is to provide a tape cassette capable of enabling a person to ascertain whether it has been kept unused so far or otherwise.

SUMMARY OF THE INVENTION

The objects of this invention described above are accomplished by a tape cassette whose cassette body has at least one of the openings, which are to be bored in the surface of the cassette body for accepting insertion of protuberances formed on a tape recorder, closed with a film readily breakable by insertion of the aforementioned protuberance, which film is formed integrally (monolithically) with the cassette body.

BRIEF DESCRIPTION OF THE DRAWING

FIG. 1 is a plan view illustrating the general appearance of a tape cassette,

FIG. 2 is an exploded perspective view of the tape cassette, and

FIG. 3 is a cross section taken along the line III—III in the diagram of FIG. 1.

PREFERRED EMBODIMENT OF THE INVENTION

A compact tape cassette such as is illustrated in FIG. 1 and FIG. 2 incorporates therein a magnetic tape 8 wound on opposed hubs 6, 7 and disposed between an upper and a lower sheet 4, 5 laid respectively along the inner sides of an upper and a lower cassette half 2, 3. The upper and lower cassette halves are fastened to each other wth screws 9. The cassette has a construction such that the magnetic tape 8 paid off one of the hubs may be passed round guide rollers 11, 11 pivotally supported on pins 10, 10 and further round a pad 13 disposed in front of a shield plate 12 and finally taken up on the other hub.

As illustrated in FIGS. 1-3, the tape cassette of the present invention has a cassette body so constructed that the cassette halves 2, 3 constituting the shelf of the cassette body have reference holes 14, 15, which are formed in the surfaces of the cassette halves to accept insertion of positioning pins (not shown) formed on the tape recorder, closed with films 17, 18 readily breakable by the insertion of the positioning pins. These films 17, 18 are formed in the reference holes integrally (monolithically as shown in FIG. 3) with the cassette halves 2, 3. Generally, the cassette halves 2, 3 are molded in a stated shape with a thermoplastic resin. The aforementioned films 17, 18, therefore, may be formed integrally (monolithically) with the cassette halves 2, 3 by molding the cassette halves by the injection molding or other molding technique in such a manner that these films 17, 18 may be left behind at the position corresponding to the reference holes 14, 15. These films have a thickness such that at the initial use of the tape cassette, the positioning pins 19 may easily pierce through the films. The films thus broken offer no hindrance of any degree when the tape cassette is in use or when the tape cassette is removed from the tape recorder.

So far the present invention has been described as embodied with the films formed in the reference holes. The effect of the invention described above can also be obtained by having the films of the foregoing description formed in the openings 20, 21 which are to accept insertion of capstans to be driven by pinch rollers in the tape recorder (not shown). The films of this nature may be effectively formed both in the reference holes 14, 15 and the openings 20, 21 for the insertion of the capstans. Optionally, just one such film may be formed in any one of the two reference holes 14, 15 and the two openings 20,21 as in the preceding case.

The tape cassette of this invention can be used as effectively in the micro-cassette as in the compact cassette described above. Of course, the films are usable in the tape cassette which is enclosed with a plastic case and then wrapped in a deluxe package. They naturally are usable in a cheap tape cassette which is simply covered partly or wholly with a cellophane plastic film or sheet serving as proof for newness of the content and is not enclosed with a plastic case.

As described above, the cassette tape of the present invention is constructed so that the cassette body thereof has at least one of the openings, which are to be bored in the surface of the cassette body for accepting insertion of protuberances formed on a tape recorder, closed with a film readily breakable by the insertion of the aformentioned protuberance, which film is formed integrally (monolithically) with the cassette body. While the tape cassette has not yet been put to use, the aforementioned films remain intact in the openings. Once it is put to use, the insertion of the positioning pins or capstans on the tape recorder into the corresponding openings in the tape cassette causes ready breakage of the films. Thus, the tape cassette of this invention has an advantage that just one look at the films in the openings will suffice to ascertain whether the tape cassette has already been used or not. Possible accidental breakage of the package in which the tape cassette is supplied cannot affect the judgement on the newness of the content, namely the tape cassette.

What is claimed is:

1. A tape cassette comprising a cassette body having at least one opening in a surface thereof for accepting insertion of a protuberance formed on a tape recorder with which the cassette is used, said opening being closed with a film readily breakable by the insertion of said protuberance, which film is formed monolithically with said cassette body, whereby an unbroken film is indicative of an unused cassette.

2. A tape cassette according to claim 1, wherein said cassette body comprises two cassette halves.

3. A tape cassette according to claim 2, wherein said cassette halves are made of a thermoplastic resin.

4. A tape cassette according to claim 2, wherein said opening is provided through a surface of one of said cassette halves in a vertical direction in use of the cassette.

5. A tape cassette according to claim 1, wherein said openings are reference holes.

6. A tape cassette according to claim 1, wherein said openings are those for accepting insertion of capstans.

7. A tape cassette according to claim 1, wherein the cassette tape is used in a compact cassette.

8. A tape cassette according to claim 1, wherein the cassette tape is used in a micro-cassette.

* * * * *